May 12, 1953     E. J. DUNHAM     2,638,173
DUAL WHEEL DRIVE WITH LUBRICATING MEANS
Filed May 31, 1950     3 Sheets-Sheet 1

FIG. I

INVENTOR.
ELMER J. DUNHAM
BY
ATTY'S.

May 12, 1953 — E. J. DUNHAM — 2,638,173
DUAL WHEEL DRIVE WITH LUBRICATING MEANS
Filed May 31, 1950 — 3 Sheets-Sheet 2

INVENTOR.
ELMER J. DUNHAM
ATTY'S.

May 12, 1953 E. J. DUNHAM 2,638,173
DUAL WHEEL DRIVE WITH LUBRICATING MEANS
Filed May 31, 1950 3 Sheets-Sheet 3

INVENTOR.
ELMER J. DUNHAM
BY
ATTY'S.

Patented May 12, 1953

2,638,173

UNITED STATES PATENT OFFICE 2,638,173

DUAL WHEEL DRIVE WITH LUBRICATING MEANS

Elmer J. Dunham, Battle Creek, Mich., assignor to Clark Equipment Company, Buchanan, Mich., a corporation of Michigan Application May 31, 1950, Serial No. 165,333

4 Claims. (Cl. 180—26)

My invention relates generally to drive means and, more specifically, to a dual wheel drive having utility, for example, for industrial trucks.

It is an object of my present invention to provide a dual wheel drive for a vehicle of the character noted, which may be utilized for steering as well as powering the latter.

I propose to accomplish this object by providing a vertically extending pinion shaft housing which, in a preferred adaptation of my invention to an industrial truck, is adapted to be rotatably mounted on the main frame of the truck, adjacent the rear end thereof. The pinion shaft housing at its upper end carries a gear casing which is closed by a suitable cover member, and a pinion shaft is journaled in the pinion shaft housing with its upper end projecting into the gear casing. A prime mover is carried by the cover member and has an output shaft which extends into the gear casing. The upper end of the pinion shaft carries a gear which has meshing engagement with a gear on the output shaft of the prime mover for effecting rotation of the pinion shaft by the prime mover. A drive axle housing is disposed at the lower end of the pinion shaft housing and provides for the journaled support of a pair of coaxially aligned laterally extending drive axles. A conventional differential mechanism is disposed within the drive axle housing for effecting driving connection between a drive pinion, at the lower end of the pinion shaft, and the pair of drive axles. A pair of drive wheels are mounted to the outer ends of the drive axles.

The prime mover, cover member, gear casing, pinion shaft housing, and drive axle housing are adapted to be rotated as a unit and, thus, when a suitable steering handle is mounted thereto, may be utilized for steering a vehicle.

By providing a differential mechanism between the drive pinion and the drive axles, one of the drive wheels may rotate faster than the other when a turn is being initialed, which reduces the effort that must be expended by an operator of a vehicle, to which my present invention is attached, when maneuvering the latter.

It is another object of my present invention to provide a dual wheel drive in which the aforementioned gear housing, pinion shaft housing, and differential housing are arranged in vertical relation, which arrangement is effective for reducing the overall length of a vehicle to which my invention is adapted to be attached.

It is still another object of my present invention to provide a dual wheel drive having drive axles of a minimum axial extent.

I propose to accomplish this object by fabricating the drive wheels with hub portions having radially extending flanges to which, at the outer edges thereof, are formed axially inwardly extending rims. The axially inwardly extending rims, which may carry suitable tires, are adapted to overlie the outer ends of the tubular axle arms of the differential housing and are adapted to be mounted closely adjacent the vertically extending pinion shaft housing, which thus serve to reduce the axial extent of the drive axles to a minimum.

It is a further object of my invention to provide a lubricating system for lubricating the gears and bearings of the dual wheel drive.

I contemplate the provision of a fluid passageway in the upper end of the pinion shaft, which passageway opens radially to the outer periphery of the pinion shaft for lubricating the latter. Fluid under pressure is transmitted to the passageway from a pump mounted in the differential housing, through a suitable fluid hose line having connection with a fluid passageway formed in the cover member, which passageway opens above the fluid passageway in the pinion shaft. Mounted to the upper end of the pinion shaft is an upwardly facing bell-shaped washer adapted to receive fluid which overflows from the fluid passageway in the pinion shaft. Disposed about the bell-shaped washer is a bracket which is secured to the cover member. The bracket has a trough which is adapted to receive fluid which overflows from the bell-shaped washer and direct the fluid to the point of contact between the pinion and gear disposed within the gear casing. All excess fluid runs down the outer periphery of the pinion shaft to the bottom of the differential housing, where it is received by the pump and recirculated.

It is a still further object of my invention to provide a lubricating pump which is driven from the differential case disposed within the differential housing.

I have provided a pump comprising a cylinder and a piston movable thereon, which piston has pivotally mounted at its outer end a follower normally biased into engagement with a cam groove formed in the outer periphery of the differential case. When the differential case is rotated the follower and piston are reciprocated and the pump then circulates lubricating fluid.

Now, in order to acquaint those skilled in the art with the manner of constructing and using devices in accordance with the principle of my present invention, I shall describe in connection with the accompanying drawings a preferred embodiment of my invention.

Figure 1:
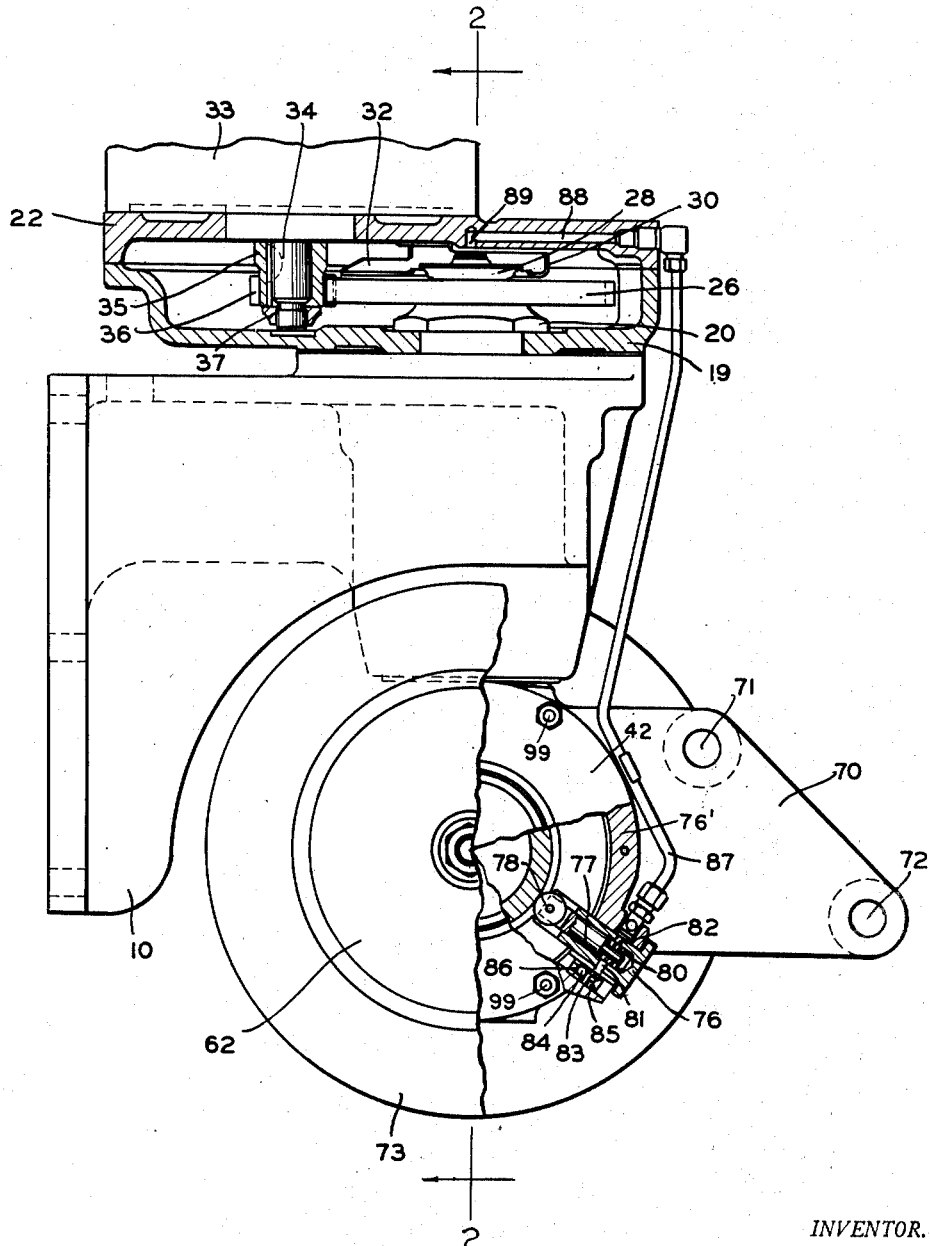
Figure 1 is a side elevational view of the dual wheel drive of my present invention, with portions being broken away and shown in section and elevation.
Figure 2:
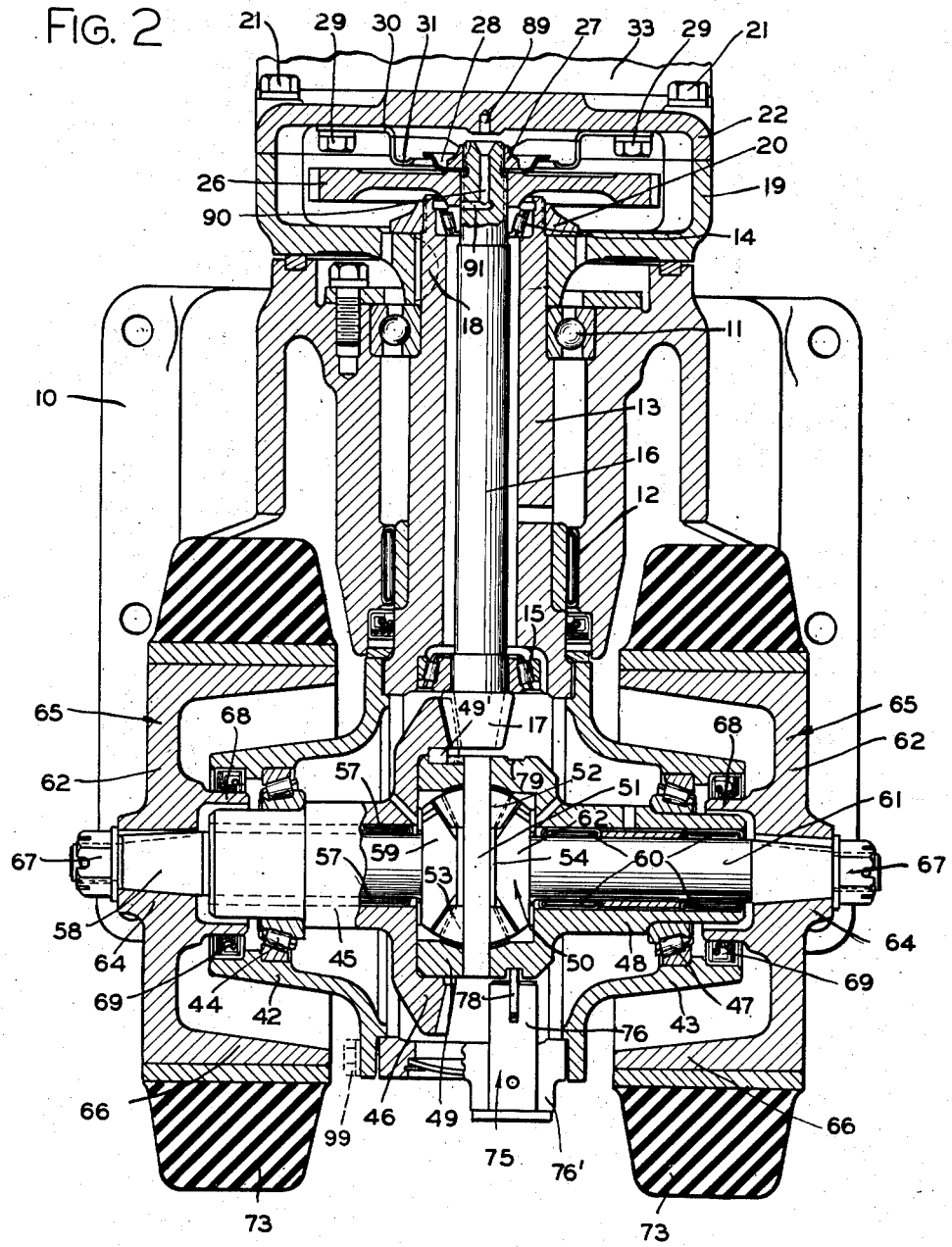
Figure 2 is a vertical sectional view of the dual wheel drive of my present invention, taken substantially along the line 2—2 in Figure 1, looking in the direction indicated by the arrows.
Figure 3:
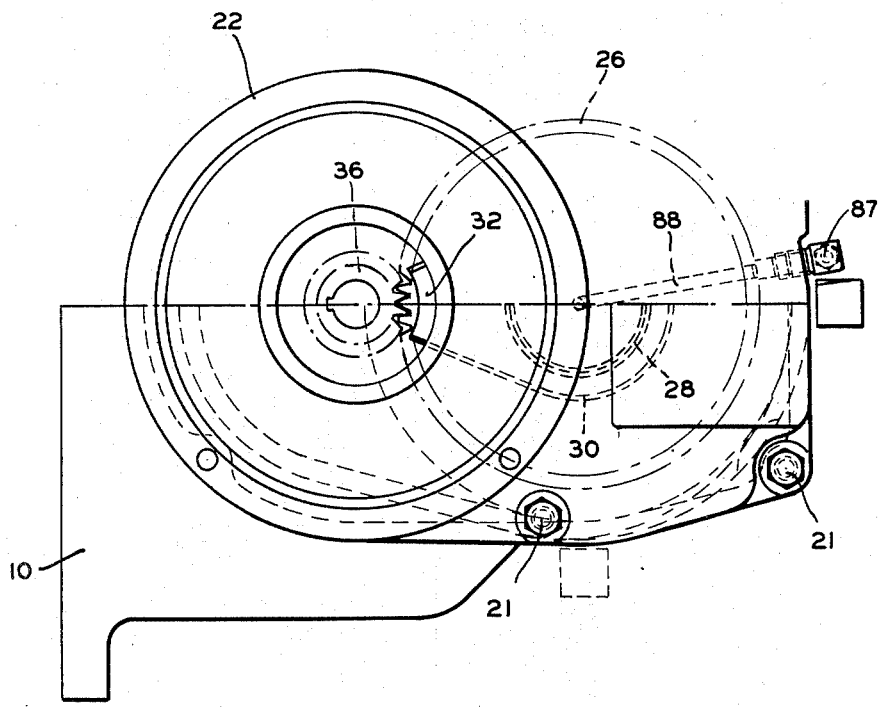
Figure 3 is a partial plan view of the dual wheel drive shown in Figure 1.

Referring now to the drawings, there is shown the dual wheel drive of my present invention which, as will be described in detail hereinafter, is rotatably mounted within a frame member 10. The frame member 10 is adapted to be secured to a vehicle as, for example, an industrial truck. The dual wheel drive of my present invention is not only adapted to drive the vehicle to which it is mounted, but also to steer the latter. Rotatably journaled within the housing 10, by means of a ball bearing assembly 11 adjacent the upper end thereof, and a plurality of needle bearings 12 adjacent the lower end thereof, is a vertically extending tubular pinion shaft housing 13. Rotatably journaled in the tubular pinion shaft housing 13, as by means of a tapered roller bearing assembly 14 adjacent the upper end thereof, and a tapered roller bearing assembly 15 adjacent the lower end thereof, is a pinion shaft 16. Secured to the pinion shaft 16 adjacent the lower end thereof is a bevel drive pinion 17, provided for a purpose to be described more fully hereinafter.

Mounted to the pinion shaft housing 13 adjacent the upper end thereof, as by means of a key 18, is a horizontally extending gear casing 19. The gear casing 19, at its lower end, is adapted to bear against the inner race of the roller bearing assembly 11, and is held in this position by means of a nut 20 threaded on the upper end of the pinion shaft housing 13. Secured to the upper edges of the gear casing 19, as by a plurality of bolts 21, is a cover member 22.

Disposed within the gear casing 19 is a horizontally extending gear 26 which is mounted to the splined upper end of the pinion shaft 16. The lower portion of the hub of the gear 26 bears against the upper portion of the inner race of the tapered roller bearing assembly 14 and is held in this position by means of a nut 27 threaded onto the upper end of the pinion shaft 16. Interposed between the gear 26 and the securing nut 27 is an upwardly facing bell-shaped washer member 28. Disposed concentrically about the bell-shaped washer 28 and secured to the cover member 22, as by a plurality of circumferentially spaced bolts 29, is a bracket member 30 having an oil collecting trough 31 which extends forwardly, as shown at 32 in Figure 1.

Secured to the upper exterior surface of the cover member 22 is the lower end of a vertically extending prime mover, indicated generally by the reference numeral 33, having an output shaft 34 which extends vertically downwardly into the gear casing 19. Keyed to the lower end of the output shaft 34 is the hub 35 of a gear 36 which is held in position by means of a nut 37 threaded onto the end of the output shaft 34. The gear 36 has meshing engagement with the aforedescribed gear 26 secured to the upper end of the pinion shaft 16. It will thus be observed that suitable driving connection is effected between the output shaft 34 of the prime mover 33 and the pinion 17 on the pinion shaft 16, by means of the gears 36 and 26.

Formed integrally with the pinion shaft housing 13, adjacent the lower end thereof, is a cylindrical portion 76' to which is secured by means of bolts 98, laterally outwardly extending tubular arm portions 42 and 43. Rotatably journaled in the tubular axle arm 42 adjacent the outer end thereof, as by means of a tapered roller bearing assembly 44, is the reduced end portion of a hub 45 of a differential bevel ring gear 46 which has meshing engagement with the aforedescribed bevel pinion 17.

Rotatably mounted in the tubular axle arm 43, as by means of a tapered roller bearing assembly 47, is the reduced end portion of a hub 48 of a differential case 49 which extends coaxially of the differential bevel ring gear 46. The differential case 49 is suitably secured at its inner end, by means of a key 49' to the differential bevel ring gear 46 for rotation therewith.

Disposed within the differential case 49 is a differential spider assembly, indicated generally by the reference numeral 50. The differential spider assembly 50 comprises a pin 51 which extends radially across the differential case 49 and is secured at its ends therein. Journaled on the pin 51 are a pair of differential bevel pinions 52 and 53 which are radially spaced by means of a collar member 54 disposed about the pin 51.

Rotatably journaled in the hub portion 45 of the differential bevel ring gear 46, by means of a plurality of needle bearings 57, is a drive axle 58 which extends laterally outwardly therefrom. Secured to the inner end of the drive axle 58 is a differential side gear 59 which has meshing engagement with the aforedescribed differential bevel pinions 52 and 53.

Rotatably journaled in the hub portion 48 of the differential case 49, as by means of a plurality of needle bearings 60, is a drive axle 61 which extends laterally outwardly therefrom, coaxially of the drive axle 58. Secured to the inner end of the drive axle 61 is a differential bevel side gear 62 which has meshing engagement with the aforedescribed differential bevel pinions 52 and 53.

Keyed to the outer tapered ends of each of the drive axles 58 and 61 are the hub portions 64 of drive wheels 65. Formed integrally with the hub portions 64 are radially extending flanges 62 which have formed at their edges axially inwardly extending rims 66. The rims 66 overlie the outer ends of the axle arms 42 and 43 for providing a dual wheel drive of minimum axial length. Solid tires 73 are mounted on the outer periphery of rims 66. The wheels 65 are held on the tapered ends of the drive axles 58 and 61 by means of nuts 67 threaded on the ends of the drive axles 58 and 61. Each of the wheels 65 is formed with an axially inwardly extending circumferential flange 68 which projects inwardly of the tubular axle arms 42 and 43. Disposed between the outer periphery of the flanges 68 of the wheels 65, and the inner periphery of the tubular axle arms 42 and 43, adjacent the ends thereof, are oil seal assemblies 69.

From the foregoing description it will be observed that drive is effected from the bevel pinion 17 to the wheels 65, through the differential bevel ring gear 46, differential casing 49, differential spider assembly 50, and the drive axles 58 and 61. When both of the wheels 65 are headed in a straightforward direction, the differential pinions 52 and 53 do not rotate on the pins 51, but serve only to lock the elements of the spider assembly 50 together causing the differential casing 49 and side gears 59 and 62 to rotate as a unit when the differential bevel gear 46 is rotated by the bevel pinion 17. When the elements of the spider assembly 50 rotate as a unit both of the wheels 65 rotate at the same speed. Upon initiating a turn, the inner wheel 65 places a drag on the corresponding drive axle 58 or 61, thereby decreasing the rotation of the latter and the corresponding side gear 59 or 62, with respect to the differential ring gear 46 and the differential casing 49. The differential case 49, through the pin 51, then forces the differential pinions 52 and 53 to rotate along the inner side gear 59 or 62, advancing the opposite side gear 59 or 62 an equivalent amount with respect to the differential case 49. The outer wheel 65 thus turns at a higher speed than the inner wheel 65.

Extending rearwardly from and preferably formed integrally with the cylindrical housing portion 76′ is a bracket 70 to which is adapted to be pivotally mounted at 71 and 72 an upwardly extending steering handle. When the bracket 70 is rotated by means of the steering handle (not shown) the tubular arm portions 42 and 43 are rotated, together with the pinion shaft housing 13, gear casing 19, cover member 22, and the prime mover 33. The drive unit is thus rotated as a unit, while drive is being transmitted to the wheels 65.

In order to effect adequate lubrication of the bearings and gears of the drive unit, there is disposed within the drive axle housing 41 a pump assembly, indicated generally by the reference numeral 75, which is suitably mounted in the bottom portion of the cylindrical housing portion 76′. The pump assembly 75 comprises a cylinder 76 in which is disposed for reciprocating motion a piston or plunger 77. The plunger 77 has rotatably journaled at its outer end, about an axis extending transversely thereof, a follower wheel 78 which is adapted to engage a cam groove 79 formed in the outer periphery of the differential casing 49. The follower 78 is biased into engagement with the cam groove 79 by means of a spring 80 disposed between the closed end of the cylinder 76 and the bottom portion of the plunger 77.

Lateral inlet and outlet openings 81 and 82 are formed in the side wall of the cylinder 76 adjacent the closed end thereof. The inlet opening 81 has communication with a passageway 83 in which is disposed a check valve comprising a ball 84 which is biased, by means of a spring 85, into engagement with the inlet opening 86 of the passageway 83 for normally closing the latter.

The outlet opening 82 of the pump assembly 75 is placed in communication with a fluid line 87, which fluid line 87 has conection at its upper end to a horizontal fluid passageway 88 formed internally of the cover member 22. The fluid passageway 88 at its inner end has connection with a vertical fluid passageway 89 which opens above a fluid passageway 90 formed in the upper end of the pinion shaft 16. The fluid passageway 90 opens into a radially extending fluid passageway 91 which opens outwardly of the pinion shaft 16 above the tapered roller bearing assembly 14 for lubricating the latter.

Rotation of the differential case 49 causes the follower 78, together with the plunger 77, to reciprocate within the cylinder 76 of the pump assembly 75. This reciprocatory motion of the plunger 77 cyclically draws oil into the cylinder 76 through the inlet opening 81, the fluid passageway 83, and the inlet opening 86 in the fluid passageway 83, from the reservoir provided at the lower portion of the cylindrical housing portion 76′. Also, cyclically, oil is discharged from the cylinder 76 of the pump assembly 75 through the outlet opening 82, into the fluid line 87. From the fluid line 87, the oil is directed under pressure to the fluid passageway 88, fluid passageway 89, and into the fluid passageway 90 formed in the pinion shaft 16.

The excess oil directed into the fluid passageway 90, formed in the pinion shaft 16, overflows the upper end of the fluid passageway 90 and flows into the bell-shaped washer 28. When the oil has filled the bell-shaped washer 28, it overflows into the oil channel 31 where it is directed, by means of the projecting portion 32, to the position of engagement between the pinion 36 and the gear 26 disposed within the gear casing 19.

The excess oil delivered to the pinion 36, the gear 26, and the tapered roller bearing assembly 14, runs downwardly along the outer periphery of the pinion shaft 16 within the pinion shaft housing 13 under the force of gravity. This excess oil lubricates the tapered roller bearing assembly 15 adjacent the lower end of the pinion shaft 16, the pinion 17, the differential ring gear 46, the differential pinions 52 and 53, and the side gears 59 and 62. The excess oil from these elements of the drive unit runs downwardly under the force of gravity into the reservoir provided adjacent the lower end of the cylindrical housing portion 76′. From the reservoir the oil is again recirculated by means of the pump assembly 75.

While I have shown and described what I believe to be a preferred embodiment of my present invention, it will be understood that various modifications and rearrangements may be made therein without departing from the spirit and scope of my present invention.

I claim:

1. A dual wheel drive comprising, a vertically extending pinion shaft housing, a pinion shaft rotatably mounted therein, a gear casing secured to the upper end of said pinion shaft housing, a gear disposed in said gear casing mounted to the upper end of said pinion shaft, means for rotating said gear, a cover member secured to said gear casing, a fluid passageway in said pinion shaft opening at the upper end of the latter and at the outer periphery of the latter, said passageway being adapted to direct fluid to the outer periphery of said pinion shaft for lubricating the latter, a fluid passageway in said cover member opening at its one end above said fluid passageway in said pinion shaft, a drive pinion secured to the lower end of said pinion shaft, a drive axle housing secured to the lower end of said pinion shaft housing, a differential mechanism comprising a differential case disposed in said drive axle housing, a cam groove formed in the periphery of said differential case, a lubricating pump mounted in the drive axle housing, said pump comprising a cylinder, a piston movable therein, a follower pivotally mounted to the end of said piston and biased into engagement with said cam groove whereby said follower and said piston are reciprocated when said differential case is rotated, means for conveying fluid from said pump to said fluid passageway in said cover member, horizontal coaxially aligned drive axles mounted for rotation in said drive axle housing, said differential mechanism effecting driving connection between said drive pinion and said drive axles, and wheels mounted to the outer ends of said drive axles.

2. A dual wheel drive comprising, a vertically extending pinion shaft housing, a pinion shaft rotatably mounted therein, a gear casing secured to the upper end of said pinion shaft housing, a gear disposed in said gear casing mounted to the upper end of said pinion shaft, a cover member secured to said gear casing, a prime mover secured to said cover member having an output shaft extending into said gear casing, a pinion disposed in said gear casing mounted on the end of said output shaft, said pinion having meshing engagement with said gear, a fluid passageway in said pinion shaft opening at the upper end of the latter and at the outer periphery of the latter, said passageway being adapted to direct fluid to the outer periphery of said pinion shaft for lubricating the latter, a fluid passageway in said cover member opening at its one end above said fluid passageway in said pinion shaft, a drive pinion secured to the lower end of said pinion shaft, a drive axle housing secured to the lower end of said pinion shaft housing, a differential mechanism comprising a differential case disposed in said drive axle housing, a cam groove formed in the periphery of said differential case, a lubricating pump mounted in the drive axle housing, said pump comprising a cylinder, a piston movable therein, a follower pivotally mounted to the end of said piston and biased into engagement with said cam groove whereby said follower and said piston are reciprocated when said differential case is rotated, means for conveying fluid from said pump to said fluid passageway in said cover member, an upwardly facing bell-shaped washer secured to the upper end of said pinion shaft for collecting fluid which overflows from said fluid passageway in said pinion shaft, a bracket member disposed concentrically about said bell-shaped washer and secured to said cover member, said bracket member having a fluid collecting trough which extends to the point of contact between said pinion and said gear in said gear casing, said fluid collecting trough being adapted to collect fluid which overflows from said bell-shaped washer and direct the latter to said pinion and said gear for lubricating the latter, horizontal coaxially aligned drive axles mounted for rotation in said drive axle housing, said differential mechanism effecting driving connection between said drive pinion and said drive axles, and wheels mounted to the outer ends of said drive axles.

3. A dual drive wheel comprising, a vertically extending pinion shaft housing, a pinion shaft rotatably mounted therein, a gear casing secured to the upper end of said pinion shaft housing, a gear disposed in said gear casing mounted to the upper end of said pinion shaft, means for rotating said gear, a cover member secured to said gear casing, a fluid passageway in said pinion shaft opening at the upper end of the latter and at the outer periphery of the latter, said passageway being adapted to direct fluid to the outer periphery of said pinion shaft for lubricating the latter, a fluid passageway in said cover member opening at its one end above said fluid passageway in said pinion shaft, a drive pinion secured to the lower end of said pinion shaft, a drive axle housing secured to the lower end of said pinion shaft housing, a differential mechanism comprising a differential case disposed in said drive axle housing, a cam groove formed in the periphery of said differential case, a lubricating pump mounted in the drive axle housing, said pump being actuated by said cam groove upon rotation of said differential case, means for conveying fluid from said pump to said fluid passageway in said cover member, horizontal coaxially aligned drive axles mounted for rotation in said drive axle housing, said differential mechanism effecting driving connection between said drive pinion and said drive axles, and wheels mounted to the outer ends of said drive axles.

4. A dual drive wheel comprising, a vertically extending pinion shaft housing, a pinion shaft rotatably mounted therein, a gear casing secured to the upper end of said pinion shaft housing, a gear disposed in said gear casing mounted to the upper end of said pinion shaft, a cover member secured to said gear casing, a prime mover secured to said cover member having an output shaft extending into said gear casing, a pinion disposed in said gear casing mounted on the end of said output shaft, said pinion having meshing engagement with said gear, a fluid passageway in said pinion shaft opening at the upper end of the latter and at the outer periphery of the latter, said passageway being adapted to direct fluid to the outer periphery of said pinion shaft for lubricating the latter, a fluid passageway in said cover member opening at its one end above said fluid passageway in said pinion shaft, a drive pinion secured to the lower end of said pinion shaft, a drive axle housing secured to the lower end of said pinion shaft housing, a differential mechanism comprising a differential case disposed in said drive axle housing, a cam groove formed in the periphery of said differential case, a lubricating pump mounted in the drive axle housing, said pump being actuated by said cam groove upon rotation of said differential case, means for conveying fluid from said pump to said fluid passageway in said cover member, an upwardly facing bell-shaped washer secured to the upper end of said pinion shaft for collecting fluid which overflows from said fluid passageway in said pinion shaft, a bracket member disposed concentrically about said bell-shaped washer and secured to said cover member, said bracket member having a fluid collecting trough which extends to the point of contact between said pinion and said gear in said gear casing, said fluid collecting trough being adapted to collect fluid which overflows from said bell-shaped washer and direct the latter to said pinion and said gear for lubricating the latter, horizontal coaxially aligned drive axles mounted for rotation in said drive axle housing, said differential mechanism effecting driving connection between said drive pinion and said drive axles, and wheels mounted to the outer ends of said drive axles.

ELMER J. DUNHAM.

References Cited in the file of this patent

UNITED STATES PATENTS

| Number | Name | Date |
|---|---|---|
| 1,308,916 | Porter | July 8, 1919 |
| 1,492,653 | Sears | May 6, 1924 |
| 1,511,873 | Davison | Oct. 14, 1924 |
| 1,921,769 | Morgan | Aug. 8, 1933 |
| 2,145,089 | Kysor | Jan. 24, 1939 |
| 2,273,630 | Dunham | Feb. 17, 1942 |
| 2,299,150 | Kennedy | Oct. 20, 1942 |
| 2,458,813 | Wanzer | Jan. 11, 1949 |